(12) United States Patent
Gruenwald

(10) Patent No.: US 9,900,581 B2
(45) Date of Patent: Feb. 20, 2018

(54) PARAMETRIC ONLINE CALIBRATION AND COMPENSATION IN TOF IMAGING

(71) Applicant: Infineon Technologies AG, Neubiberg (DE)

(72) Inventor: Johannes Gruenwald, Graz (AT)

(73) Assignee: Infineon Technologies AG, Neubiberg (DE)

( * ) Notice: Subject to any disclaimer, the term of this patent is extended or adjusted under 35 U.S.C. 154(b) by 385 days.

(21) Appl. No.: 14/692,626

(22) Filed: Apr. 21, 2015

(65) Prior Publication Data

US 2016/0316193 A1    Oct. 27, 2016

(51) Int. Cl.
| | |
|---|---|
| *G01S 17/36* | (2006.01) |
| *H04N 13/02* | (2006.01) |
| *G01S 17/89* | (2006.01) |
| *G01S 17/93* | (2006.01) |
| *G01S 7/497* | (2006.01) |

(52) U.S. Cl.
CPC ......... *H04N 13/0253* (2013.01); *G01S 7/497* (2013.01); *G01S 17/36* (2013.01); *G01S 17/89* (2013.01); *G01S 17/936* (2013.01); *H04N 13/0246* (2013.01)

(58) Field of Classification Search
None
See application file for complete search history.

(56) References Cited

U.S. PATENT DOCUMENTS

| | | | |
|---|---|---|---|
| 2011/0164132 A1* | 7/2011 | Buettgen | G01S 17/36 348/135 |
| 2013/0004151 A1* | 1/2013 | Wakamatsu | G02B 27/646 396/55 |
| 2013/0027700 A1* | 1/2013 | Youngner | G01J 3/2803 356/310 |
| 2013/0211672 A1* | 8/2013 | Roehder | G06F 17/00 701/36 |

* cited by examiner

*Primary Examiner* — Eileen Adams
(74) *Attorney, Agent, or Firm* — Harrity & Harrity, LLP

(57) ABSTRACT

Representative implementations of devices and techniques provide adaptive calibration and compensation of wiggling error for imaging devices and systems. In various implementations, the wiggling error is modelled using identified parameters. For example, the parameters (or coefficients) of the wiggling error are estimated using the model. In an implementation, the imaging system uses the derived model to adaptively compensate for the wiggling error during runtime.

26 Claims, 7 Drawing Sheets

PARAMETRIC ONLINE CALIBRATION AND COMPENSATION IN TOF IMAGING

BACKGROUND

Imaging systems based on light waves are becoming more widely used for object detection as semiconductor processes have become faster to support such systems. Some imaging systems are capable of providing dozens of images per second, making such systems useful for object detection and/or tracking as well. Due to their potentially small form factor and potentially high signal fidelity, some imaging systems are well suited for application in many types of vehicles (cars, busses, trains, etc.). Additionally, some imaging systems are well suited for gesture control, or the like, in many types of consumer devices (e.g., television, computers, tablets, smartphones, etc.). While the resolution of such imaging systems may vary, applications using these systems are able to take advantage of the speed of their operation.

A moving vehicle such as an automobile, for example, may use an imaging system to detect an object (a pedestrian, for example) in the path of the vehicle, to avoid hitting the object. For example, an imaging system may be employed on the front, rear, and/or the side(s) of the vehicle to detect objects in the forward or reverse paths of the vehicle, to the side of the vehicle, or in the blind spots of the vehicle.

Time-of-flight (ToF) cameras, for example, may use imaging devices to measure the distance of an object from the camera. Imaging devices using multiple pixels may also be used, where light signals associated with individual pixels may provide distance measurements for discrete points on the object, forming a three-dimensional "distance image." This can be made possible with light signals reflected off of the discrete points, for example.

Whether deployed in a vehicle application, a consumer device application, or other type of application, it is desirable to increase the accuracy of the imaging systems while maintaining or improving the performance and minimizing error. For example, the usefulness of an imaging system as applied to a vehicle, mobile device, or the like, can be diminished when the accuracy or clarity of the distance measurements is error-prone or otherwise unreliable.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure.

DETAILED DESCRIPTION

Overview

Figure 1:
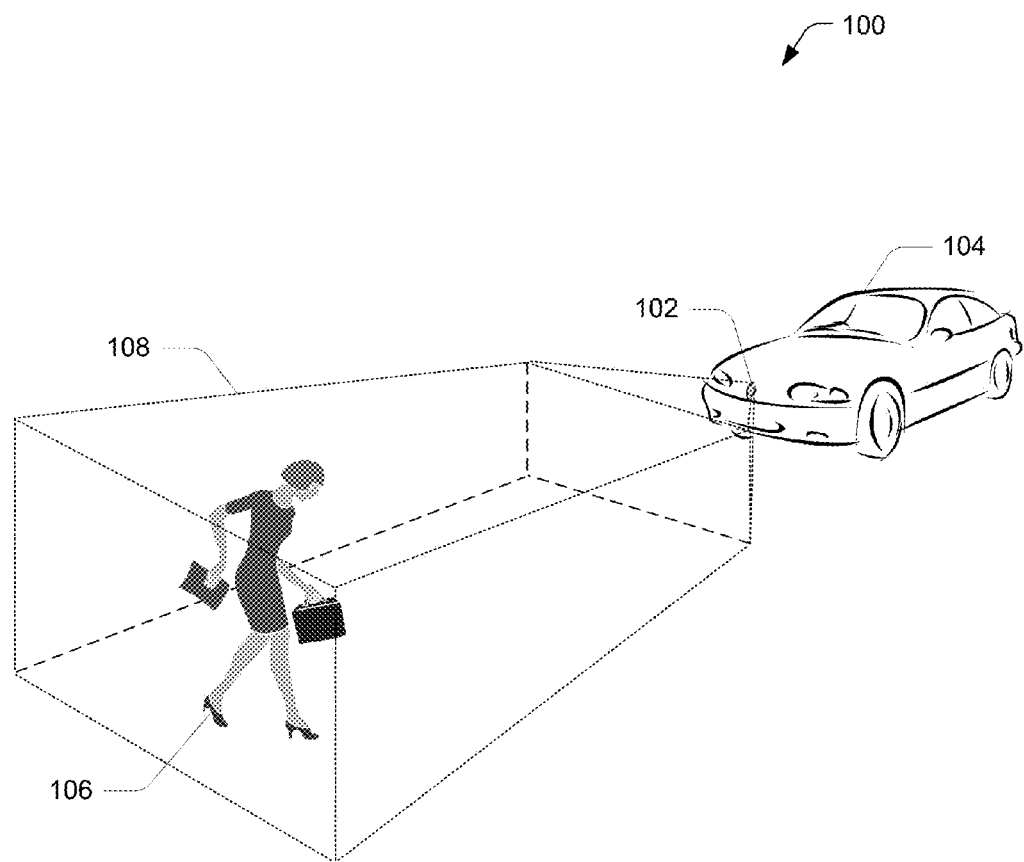
FIG. 1 is an illustration of an example application environment in which the described devices and techniques may be employed, according to an implementation.

This disclosure is related to imaging systems (imaging systems using emitted electromagnetic (EM) radiation, for example) that are arranged to detect, image, recognize, and/or track objects and/or gestures in a predetermined area relative to the imaging systems. For example, an imaging system associated with a vehicle may be used to detect an object in the path of the vehicle, or in an area near the vehicle. Additionally, the imaging system may track the object or provide an image (such as a three-dimensional image, for example) of the object. In other examples, an imaging system may be used to detect and recognize gestures of an object or a human hand, for instance, in an area near a computing device. The imaging system may recognize when the object or hand is making a gesture, and track the hand-gesture combination as a replacement for a mouse or other input to the computing device.

In various implementations, the imaging system uses time-of-flight principles, such as distance calculations of reflected EM emissions (i.e., electro-magnetic radiation), to detect, image, recognize, and/or track objects, for example. Time-of-flight distance calculations may be based on receiving reflections of emitted EM ("light") radiation, as the light radiation is reflected off objects in a predetermined area. For example, in one case, the distance calculations may be based on the speed of light and the travel time of the reflected light radiation.

In most cases, the EM radiation is not perfectly sinusoidal, but includes higher frequency components. Distance measurement errors ("wiggling error") can result from these higher frequency components, as the imaging system attempts to determine distance information from phase information of the EM radiation.

Representative implementations of devices and techniques provide adaptive calibration and compensation of wiggling error for imaging devices and systems. In such implementations, a model of the wiggling error is established. This model may express the wiggling error in terms of a mathematical formula and/or computation algorithm. Furthermore, in some implementations, the model is not static, but comprises a set of parameters (or coefficients) which define the basic transfer characteristics of the model. These parameters may be estimated and updated during runtime. Upon successful estimation and/or update of the parameters, the model of the wiggling error may be employed in order to adaptively compensate for erroneous distance information. In comparison to state-of-the-art methods, which may be based on offline, lookup-table-based calibration, this approach is superior in terms of flexibility, efficiency, memory, and time consumption.

In some implementations, the imaging system includes multi-phase sampling. For example, the imaging system samples the output of the sensors of the imaging system with multiple samples at equidistant sampling points. In one implementation, the imaging system includes an alternating or shifting sampling phase offset. In an implementation, the wiggling error is modelled using phasors in a complex plane.

In an implementation, the imaging system can use information from multiple image frames to estimate the parameters of the wiggling error. In one example, the imaging system uses the information from at least two successive image frames, with shifted (e.g., phase shifted) sampling points. In another implementation, once the imaging system has estimated the parameters of the wiggling error, the imaging system can compensate for the wiggling error in single captured frames.

Various implementations and arrangements for imaging systems, devices, and techniques are discussed in this disclosure. Techniques and devices are discussed with reference to example light-based imaging systems and devices illustrated in the figures. However, this is not intended to be limiting, and is for ease of discussion and illustrative convenience. The techniques and devices discussed may be applied to any of various imaging device designs, structures, and the like (e.g., radiation based, sonic emission based, particle emission based, etc.) and remain within the scope of the disclosure.

Implementations are explained in more detail below using a plurality of examples. Although various implementations and examples are discussed here and below, further implementations and examples may be possible by combining the features and elements of individual implementations and examples.

Example Imaging System Environment

FIG. 1 is an illustration of an example application environment 100 in which the described devices and techniques may be employed, according to an implementation. As shown in the illustration, an imaging system 102 may be applied with a vehicle 104 (e.g., automobile, bus, train, aircraft, etc.), for example. In various other implementations, the imaging system 102 may be applied with other systems, devices, and the like (e.g., robotics, automation, surveillance systems, accessibility devices, safety systems, and so forth).

In further implementations, the imaging system 102 may be applied with mobile devices or other computing devices such as laptop or notebook computers, hand-held computing devices, tablet computing devices, netbook computing devices, personal digital assistant (PDA) devices, reader devices, smartphones, mobile telephones, media players, wearable computing devices, stationary computers, personal or desktop computers, televisions, set-top boxes, gaming consoles, audio/video systems, appliances, and the like.

The scope of the disclosure is not intended to be limited to the examples listed. For convenience, reference within this disclosure to a vehicle 104 also refers to all applications employing an imaging system 102 as mentioned above, and otherwise.

In various implementations, the imaging system 102 may be integrated with the vehicle 104, or may have some components separate or remote from the vehicle 104. For example, some processing for the imaging system 102 may be located remotely (e.g., cloud, network, etc.). In another example, some outputs from the imaging system 102 may be transmitted, displayed, or presented on a remote device or at a remote location.

The imaging system 102 may be used to detect an object 106, such as a pedestrian, for example, in a preselected area 108. In various implementations, the imaging system 102 may be arranged to detect, recognize, and/or track the movement of the object 106. In one implementation, the imaging device is arranged to output an image (e.g., a two-dimensional or three-dimensional image) of the object 106. In an example implementation, an output of the imaging system 102 may be presented or displayed on a display device, for example (e.g., a mobile computing device, a smartphone, a vehicle information system, etc.).

An example object 106 may include any item that an imaging system 102 may be arranged to detect, recognize, track, and/or the like. Such items may include a person or an animal, for example. Other examples of an object 106 may include an obstruction, a target component, another vehicle, and so forth. In various implementations, the imaging system 102 may also be arranged to detect, recognize, and/or track a gesture or configuration of the object 106. A gesture or configuration may include any movement or position of the object 106 that is expressive of an idea. For example, a gesture or configuration may include positioning an object 106 in an orientation and/or a movement of the object 106 in a pattern (e.g., in an elliptical motion, in a substantially linear motion, etc.). In one example, the imaging system 102 may be used to detect movement (e.g., a gesture) of a human hand, for example, as a replacement for a mouse or other input device for a computing device, mobile device, or the like.

The imaging system 102 may be arranged to detect, recognize, and/or track an object 106 that is within a preselected area 108 relative to the imaging system 102. A preselected area 108 may be chosen to encompass an area that objects 106 may be within, for example. In one case, the preselected area 108 may encompass an area that represents an immediate or distant forward or reverse path for the vehicle 104. This area 108 may also be to the front, side, or around the imaging system 102, for example.

The illustration of FIG. 1 shows a preselected area 108 as a polygonal-like area in front of the vehicle 104. This is for illustration and discussion purposes, and is not intended to be limiting. A preselected area 108 may be any shape or size, may be located in front, back, side(s), top, and/or bottom of the vehicle 104, and may be chosen such that it will generally encompass desired objects when they are present, but may not encompass undesired objects (e.g., other items that are not intended to be detected, recognized, tracked, or the like). In various implementations, the preselected area 108 may comprise various shapes and sizes. In some implementations, the shape and size of the preselected area 108 is dependent on the current application of the imaging device 102.

As discussed above, the techniques, components, and devices described herein with respect to an imaging system 102 are not limited to the illustration in FIG. 1, and may be applied to other imaging system and device designs and/or applications without departing from the scope of the disclosure. In some cases, additional or alternative components may be used to implement the techniques described herein. It is to be understood that an imaging system 102 may be implemented as stand-alone system or device, or as part of another system (e.g., integrated with other components, systems, etc.).

Example Imaging System

Figure 2:
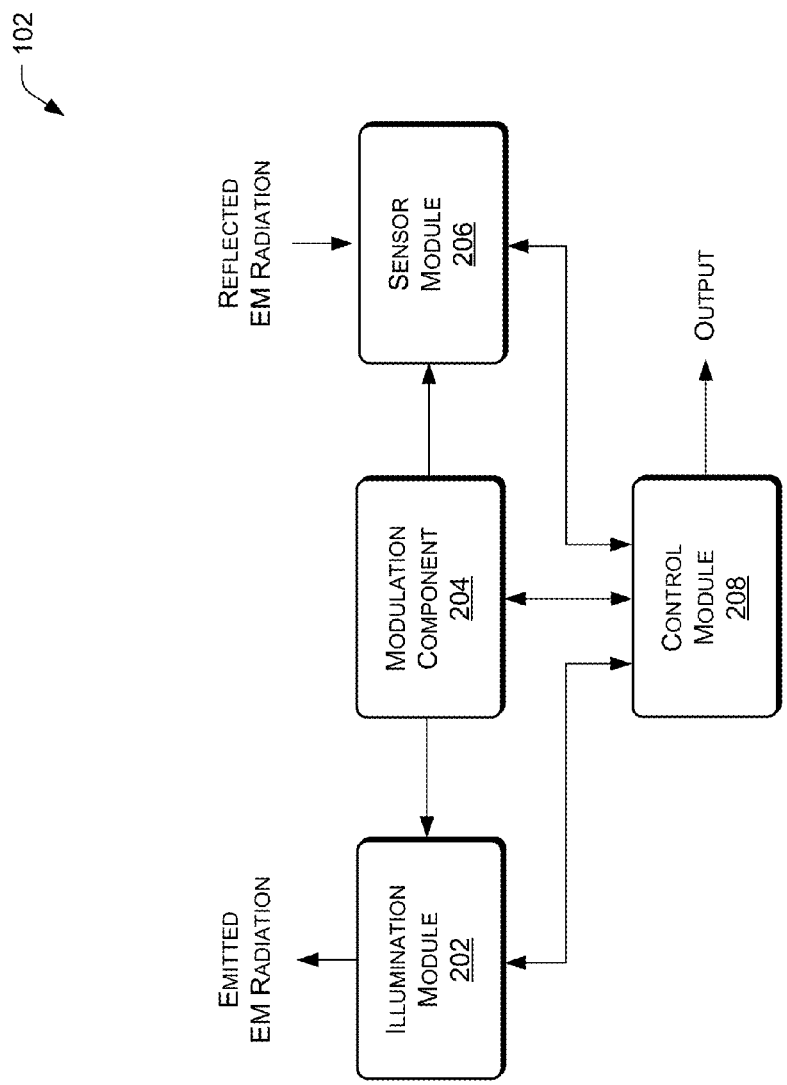
FIG. 2 is a block diagram of example imaging system components, according to an implementation.

FIG. 2 is a block diagram showing example components of an imaging system 102, according to an implementation. As shown in FIG. 2, an imaging system 102 may include an illumination module 202, a modulation component 204, a sensor module 206, and a control module 208. In various implementations, an imaging system 102 may include fewer, additional, or alternate components, and remain within the scope of the disclosure. One or more components of an imaging system 102 may be collocated, combined, or otherwise integrated with another component of the imaging system 102. For example, in one implementation, the imaging system 102 may comprise an imaging device or apparatus. Further, one or more components of the imaging system 102 may be remotely located from the other(s) of the components.

In an implementation, the illumination module 202 is arranged to emit electromagnetic (EM) radiation (e.g., light radiation) to illuminate the preselected area 108. For example, the illumination module 202 may be arranged to illuminate one or more objects 106 that may be present in the area 108, to detect the objects, or to detect movement of the objects 106. In various implementations, the illumination module 202 includes an illumination source such as a light emitter, for example. In one implementation, the illumination source comprises a light-emitting diode (LED). In another implementation, the illumination source comprises a laser emitter. In one implementation, the illumination module 202 illuminates the entire environment (e.g., the preselected area 108) with each light pulse emitted. In an alternate implementation, the illumination module 202 illuminates the environment in stages or scans.

In various implementations, different forms of EM radiation may be emitted from the illumination module 202. In some implementations, infrared light, or the like, is emitted. For example, the light radiation may comprise one or more modulated light pulses. The illumination module 202 may be switched on for a short interval, allowing the emitted light pulse(s) to illuminate the area 108, including any objects 106 within the area 108. Infrared light, for example, provides illumination to the area 108 that is not visible to the human eye, and so is not distracting. In other implementations, other types or frequencies of EM radiation may be emitted that provide visual feedback or the like. As mentioned above, in alternate implementations, other energy forms (e.g., radiation based, sonic emission based, particle emission based, etc.) may be emitted by the illumination module 202.

If included in an implementation, the modulation component 204 may be arranged to modulate the EM radiation emitted from the illumination module 202 and/or to modulate one or more components (e.g., photosensitive pixels 302) of the sensor module 206. In various implementations, the modulation component 204 may be arranged to correlate the modulation of the EM radiation with the modulation of the components of the sensor module 206 during time-of-flight operation (e.g., to calculate a distance of an object 106 from the imaging system 102 and/or to form a two-dimensional or three-dimensional image of the object 106, for example).

Figure 3:
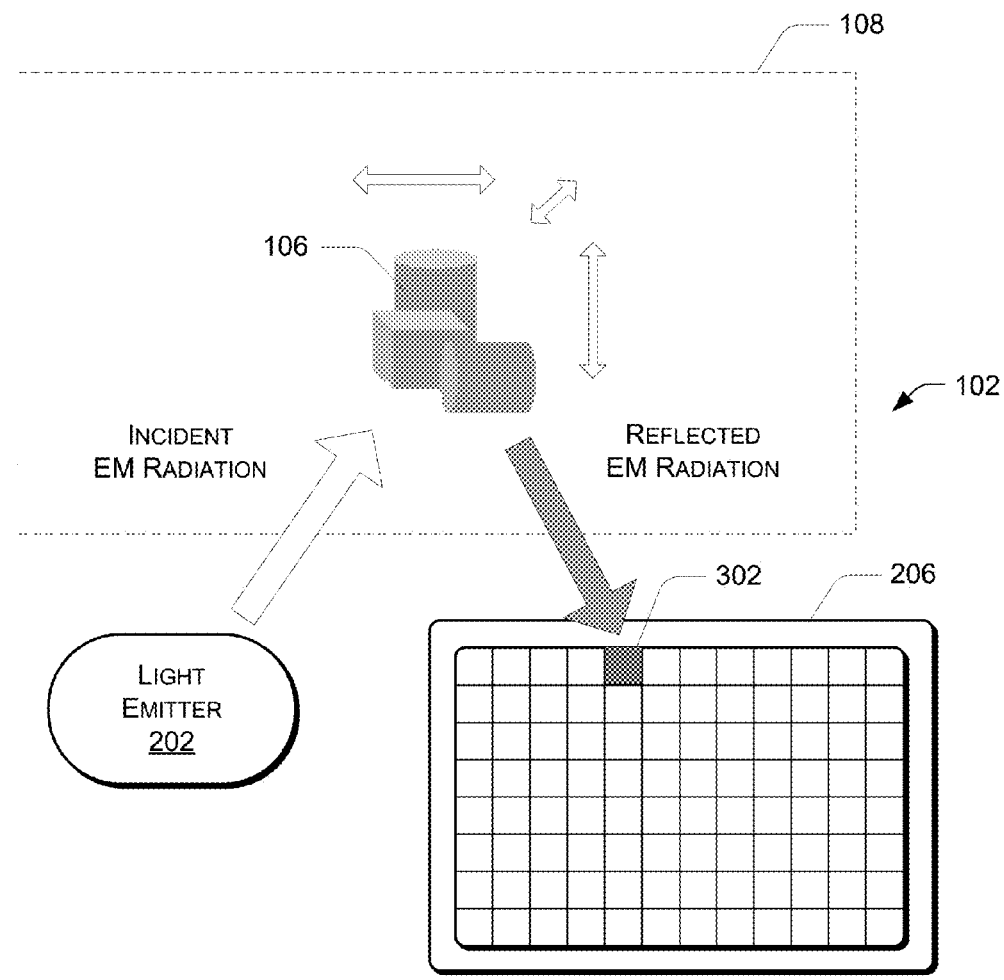
FIG. 3 is a block diagram showing some detail of components of an example imaging system, including a sensor module comprising a plurality of pixels, according to an implementation.

In various implementations, as shown in FIGS. 2 and 3, a sensor module 206 is included in an imaging system 102. In an implementation, the sensor module 206 comprises an imaging sensor arranged to receive (e.g., capture) reflected light radiation from one or more objects 106 in the area 108 during a frame event (i.e., during an image capture at a point in time). In one example, the sensor module 206 may be arranged to capture an image (e.g., two-dimensional image or three-dimensional image) of the area 108 or of the object 106 within the area 108 based on receiving the reflection of the light radiation. The sensor module 206 may be arranged to capture the image using time-of-flight principles, for instance.

In another example, the sensor module 206 is arranged to provide phase shift information between the incident light radiation and the reflected light radiation for distance measurement calculations. For instance, in an implementation, the sensor module 206 is arranged to capture one or more phase delay values of the light radiation reflected off one or more objects 106 in the area 108 during a frame event. The phase delay values represent a phase shift in the reflected light radiation from the incident light radiation, based on a distance travelled.

In an implementation, as shown in FIG. 3, the sensor module 206 is comprised of a plurality of photosensitive pixel devices ("pixels") 302. In one example, each of the multiple pixels 302 may act as an individual image sensor. In such an example, a resulting multi-dimensional image (such as a three-dimensional "distance image," for example) from the sensor module 206 is a combination of the light radiation received at multiple individual pixels 302.

In an implementation, each of the plurality of photosensitive pixels 302 are arranged to capture light radiation reflected off one or more objects 106 in the area 108. In various implementations, the light radiation captured by individual pixels 302 during a frame event may be processed within the control module 208, for instance, to determine individual distances from the object(s) 106 in the area 108 to the individual pixels 302. The distances associated with the individual pixels 302 may be combined to form the three-dimensional distance image of the object(s) 106 and/or of the area 108.

When included in an implementation, the control module 208 may be arranged to provide controls and/or processing to the imaging system 102. For example, the control module 208 may control the operation of the imaging system 102, control the operation of one or more of the other modules (202, 204, 206), and/or process the signals and information output by one or more of the other modules (202, 204, 206). In various implementations, the control module 208 is arranged to communicate with one or more of the illumination module 202, modulation component 204, and sensor module 206. In some implementations, the control module 208 may be integrated into one or more of the other modules (202, 204, 206), or be remote to the modules (202, 204, 206).

In one implementation, the control module 208 is arranged to detect, recognize, and/or track an object 106 within the area 108, based on information received from the sensor module 206. In various implementations, the control module 208 may be programmed to recognize some objects 106 and/or gestures and exclude others.

In various implementations, the control module 208 is arranged to calculate a distance from the one or more objects 106 to the sensor module 206, based on one or more phase delay values of the light radiation captured by the sensor module 206 (e.g., the pixels 302) during one or more frame events. In one example, the phase delay values are samples of the correlation function, which is the analog output of a pixel 302.

For example, in an implementation, the distance from an object 106 to the sensor module 206 may be estimated based on a phase change of the incident light with respect to the reflected light. The captured phase delay values indicate the distance the light travelled as it was emitted from the illumination module 202, reflected off an object 106, and captured by the sensor module 206 during a frame event.

In one implementation, as shown in FIG. 3, where the sensor module 206 is comprised of multiple pixels 302, the control module 208 is arranged to calculate distances from the one or more objects 106 within the area 108 to individual pixels 302 of the plurality of pixels 302. In the implementation, the distance calculations are based on one or more phase delay values captured by the individual pixels 302. Each set of phase delay values captured may be used by the control module 208 to estimate a distance from the object(s) 106 to the individual pixel 302 that captured the set.

In some implementations, two, three, four, or another quantity of phase delay values may be used for each pixel's distance estimation, to improve accuracy of the estimation. Accordingly, the number of distance calculations (per pixel 302) performed for a frame event may be based on the quantity of pixels 302 comprising the sensor module 208 (i.e., the resolution of the sensor module 208) and the quantity of phase delay values captured per pixel 302.

In an implementation, the phase delay values may correspond to sampling points at reference phases. For example, a set of reference phases may include one or more phase angles used as index values (e.g., sampling points) with respect to the light radiation, to show a phase shift in the reflected light. In one example, each set of reference phases comprises three or more equally-spaced phase angles (e.g., 0°, 90°, 180°, and 270°) and the phase delay values comprise a corresponding quantity of phase shifts relative to each reference phase angle. A corresponding phase shift with respect to its associated reference phase indicates a distance traveled by the light radiation while traversing from the light emitter 202, being reflected off the object 106, and being captured by the image sensor 206.

In an implementation, the control module 208 may include at least one or more processing components ("processor") and one or more memory storage devices. In various implementations, the processor may comprise a computing device, a controller, logic components, or the like. In the implementations, the processor is arranged to calculate a distance from the one or more objects 106 to the imaging sensor 206 (e.g., sensor module), based on one or more phase delay values of the light radiation captured during a frame event.

In an implementation, the phase delay values, as well as other information, may be stored in the memory, and accessed by the processor. In the implementation, the memory comprises any memory storage device (integrated or separate hardware from the processor) capable of storing digital information (electrically, optically, magnetically, etc.) accessible by a processing component, such as the processor.

In one implementation, the control module 208 is arranged to output the calculated distance and/or the three-dimensional image of the object 106. For example, the imaging system 102 may be arranged to output a distance, a three-dimensional image of the detected object 106, tracking coordinates of the object 106, and so forth, to a display device, to another system arranged to process the information, or the like.

In the various implementations, the imaging system 102 uses Time-of-Flight (ToF) 3D-imaging techniques based on propagation-delay measurements of emitted (and reflected) light beams, as described above. For example, the emitted light (from the illumination module 202) may be modulated by the modulation component 204 at a certain frequency $f_{mod}$ (e.g. 20 MHz). At time of return to the sensor module 206, the covered distance can be reconstructed by the control module 208 from its phase shift via the speed of light. In an implementation, the phase shift is estimated by correlating the incident signal with its non-delayed pendant on chip. In some implementations, the outputs of each single imaging pixel 302 are the N (e.g. 3, 4, 6, 8, etc.) equidistant samples of a correlation function waveform, referred to as the sensor-response function (SRF), shown in FIG. 4.

Figure 4:
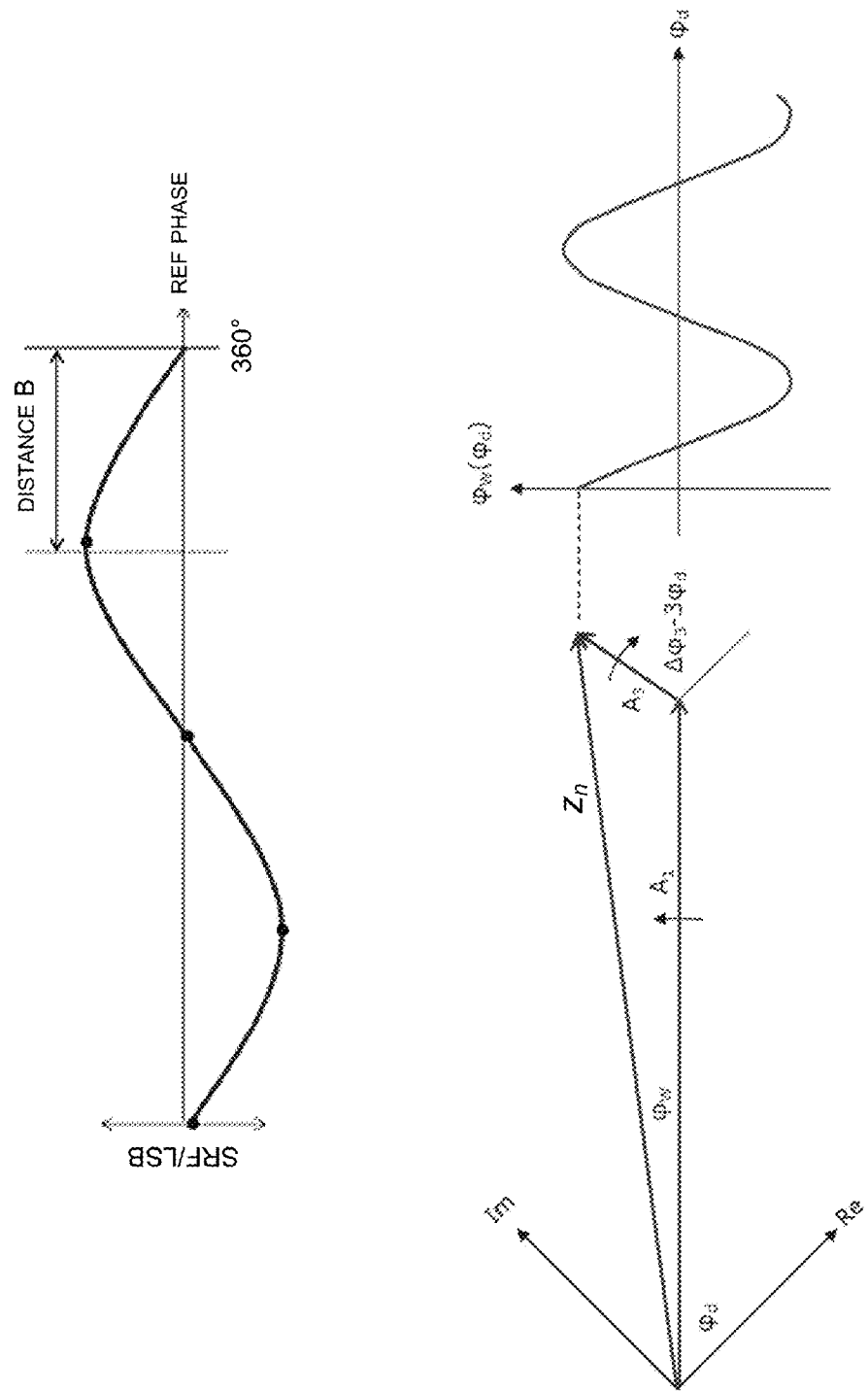
FIG. 4 shows illustrations of an example sensor response function waveform, and a phasor diagram and waveform illustrating an example of the "wiggling error," according to various implementations.

The shape of the SRF can vary between triangular and sinusoidal, depending on the modulation frequency. In some imaging systems 102, distance estimation algorithms compute the phase of the fundamental wave of the SRF and can reconstruct the distance information from this value. FIG. 4 illustrates a typical shape of a SRF waveform and refers to a distance B, which represents the distance measurement of the imaging system 102. The four equidistant dots on the SRF waveform indicate the example discrete samples (e.g., taken at the equidistant sampling points) at the output of the sensor 206.

As mentioned above, the emitted EM signal of an imaging system 102 may not be perfectly sinusoidal, but can contain higher frequency components. In various applications, the presence of the higher frequency components can lead to a systematic distance error (e.g., the wiggling error) when attempting a distance reconstruction based on the phase of the fundamental wave of the SRF. The amplitude of the wiggling error depends on the relative amplitude of the higher frequency components and is deterministic. The higher frequency components can cause deviations in measurement up to several degrees/centimeters. In the context of systematic distance errors, the wiggling error can have one of the highest impacts on the accuracy of distance estimation.

Example Implementation

In an implementation, the imaging system 102 generates a parametric model of the wiggling error as described herein below. In another implementation, the imaging system 102 performs online (e.g., adaptive, dynamic, during runtime) parameter-estimation based on the generated model and performs error compensation based on the modelled wiggling error.

For the purposes of discussion, the following example implementation is considered (in alternate examples, implementations having other characteristics are within the scope of the disclosure): In the implementation, the imaging system 102 is based on four-fold sampling, i.e., at each imaging frame, four equidistantly acquired values of the SRF waveform are sampled by the imaging system 102 (e.g., by the control module 208, based on information from the sensor module 206). At every other frame, the sampling points are shifted half the sampling distance, i.e.,

| frame n sampling points: | 0° (0) | 90° ($\pi/2$) | 180° ($\pi$) | 270° ($3\pi/2$) |
| frame n + 1 sampling points: | 45° ($\pi/4$) | 135° ($3\pi/4$) | 225° ($5\pi/4$) | 315° ($7\pi/4$) |

In the implementation, the emitted EM signal (e.g., emitted by the illumination module 202), and therefore the SRF waveform, contains a fundamental wave and one dominating harmonic of third order.

In an implementation, since the phase of the fundamental wave is the basis for ToF distance estimation, the first bin of the 4-point discrete Fourier transform (DFT) is evaluated by the control module 208, for example. In other words, the first four equidistant samples of the SRF waveform are converted to the frequency domain. Since these values are generally complex-valued, it can be seen as a phasor in the complex plane, as shown in the lower graph of FIG. 4. At frame n, the observed phasor at a certain pixel 302 can be expressed as $$z_n = A_1 e^{i\varphi_d} + A_3 e^{i(\Delta\varphi_3 - 3\varphi_d)} \quad (1)$$

where $A_1$ and $A_3$ refer to the amplitudes of the fundamental wave and third harmonic, respectively. $\varphi_d$ denotes the phase of the fundamental wave, which corresponds, up to an arbitrary offset, to the true distance. $\Delta\varphi_3$ is the phase offset between the third harmonic and the fundamental wave. If the underlying signal shape does not change, this phase offset is independent of the distance and does not vary over time. The complex conjugation of the third harmonic and the expression of the respective phase terms are an outcome of Fourier analysis and spectral aliasing theory in the context of ToF imaging systems.

In an implementation, the imaging system 102 is already offset-calibrated, i.e., the phase of the fundamental wave, $\varphi_d$, directly refers to the true distance. In alternate implementations, this offset calibration is not needed in advance, but simplifies the derivation below.

Referring to FIG. 4, in an implementation, if $A_1 \gg A_3$, the following relationships can be shown:

$$\hat{\varphi}_d = \varphi_d + \varphi_w \quad (2)$$

$$\cong \varphi_d + \frac{A_3}{A_1}\sin(\Delta\varphi_3 - 4\varphi_d)$$

$$= \varphi_d + k \cdot \sin(-4\varphi_d + \Delta\varphi_3)$$

In the implementation, if (when) the two coefficients k and $\Delta\varphi_3$ are known, the wiggling error model is complete and compensation is possible. In one example, these parameters (coefficients k and $\Delta\varphi_3$) are estimated by combining two successive image frames with shifted sampling points. Noting that shifting the sampling points by $\pi/4$ refers to a virtual distance shift of the same quantity, the observed phasor obtained at frame n+1 evaluates to $$z_{n+1} = A_1 e^{i(\varphi_d + \frac{\pi}{4})} + A_3 e^{i(\Delta\varphi_3 - 3(\varphi_d + \frac{\pi}{4}))} \quad (3)$$

$$= A_1 e^{i(\varphi_d + \frac{\pi}{4})} + A_3 e^{i(\Delta\varphi_3 - 3\varphi_d - \frac{3\pi}{4})}$$

Applying a compensation term of $$e^{-i\frac{\pi}{4}}$$

yields $$z_{n+1} e^{-i\frac{\pi}{4}} = A_1 e^{i\varphi_d} + A_3 e^{i(\Delta\varphi_3 - 3\varphi_d)} e^{-i\pi} \quad (4)$$

$$= A_1 e^{i\varphi_d} - A_3 e^{i(\Delta\varphi_3 - 3\varphi_d)}.$$

From equations 1-4, the coefficients of the wiggling error model can be estimated as follows:

$$z_n - z_{n+1} e^{-i\frac{\pi}{4}} = 2A_3 e^{i(\Delta\varphi_3 - 3\varphi_d)} \quad (5)$$

$$z_n + z_{n+1} e^{-i\frac{\pi}{4}} = 2A_1 e^{i\varphi_d}$$

$$\hat{k} = A_3/A_1 = \frac{|z_n - z_{n+1} e^{-i\frac{\pi}{4}}|}{|z_n + z_{n+1} e^{-i\frac{\pi}{4}}|}$$

$$\Delta\hat{\varphi}_3 = \arg(z_n - z_{n+1} e^{-i\frac{\pi}{4}}) + 3\arg(z_n + z_{n+1} e^{-i\frac{\pi}{4}}) \quad (6)$$

In an implementation, error compensation is carried out based on a reformulation of Eq. (2), i.e., $$\varphi_{d,rec} = \hat{\varphi}_d - \hat{k} \cdot \sin(-4\hat{\varphi}_d + \Delta\hat{\varphi}_3) \quad (7)$$

Note: In an implementation, Eq. (7) would take the true distance $\varphi_d$ as an argument. However, when only the observed (and thus erroneous) distance $\hat{\varphi}_d$ is available, it may also be used, since it can be shown that the additional error is very small. Nevertheless, in some alternate implementations, iterative evaluation can be used to enhance performance and minimize the additional error.

In various implementations, based on the model derived above, if two image frames are captured that contain negligible movement (e.g., less than a predefined threshold amount of movement), the coefficients of the wiggling error model can be estimated based on Eqs. (5,6). In an implementation, the compensation shift $e^{-i\pi/4}$ is applied to the image frame sampled with the offset sampling points (e.g., every other frame, denoted by n+1 in the preceding derivation).

The technique described herein is pixel-based. In alternate implementations, since the wiggling error is known to be equal/similar over the whole pixel array (e.g., sensor module 206), several pixels 302 may be combined in the estimation phase in order to decrease the estimation error.

The technique described herein also presumes the wiggling error to be constant. However, in alternate implementations, the wiggling error is not constant and the two parameters k and $\Delta\varphi_3$ can show potential variation over pixel 302 position and/or over scene (106,108) variation. In the alternate implementations, the model parameters k and $\Delta\varphi_3$ can be dynamically (e.g., periodically, regularly, or constantly) updated to allow for coefficient variations over pixel 302 position. In either case, once the two coefficients k and $\Delta\varphi_3$ are determined, wiggling error compensation can be carried out according to Eq. (7).

In an implementation, once a parameter set comprising the two coefficients k and $\Delta\varphi_3$ is determined (e.g., estimated), compensation of the wiggling error using one acquired image frame is possible, independent of previous frames. Thus, there is no interdependency between frames that can result in higher susceptibility to motion artifacts, for example.

In various implementations, additional or alternative components may be used to accomplish the disclosed techniques and arrangements.

Figure 5:
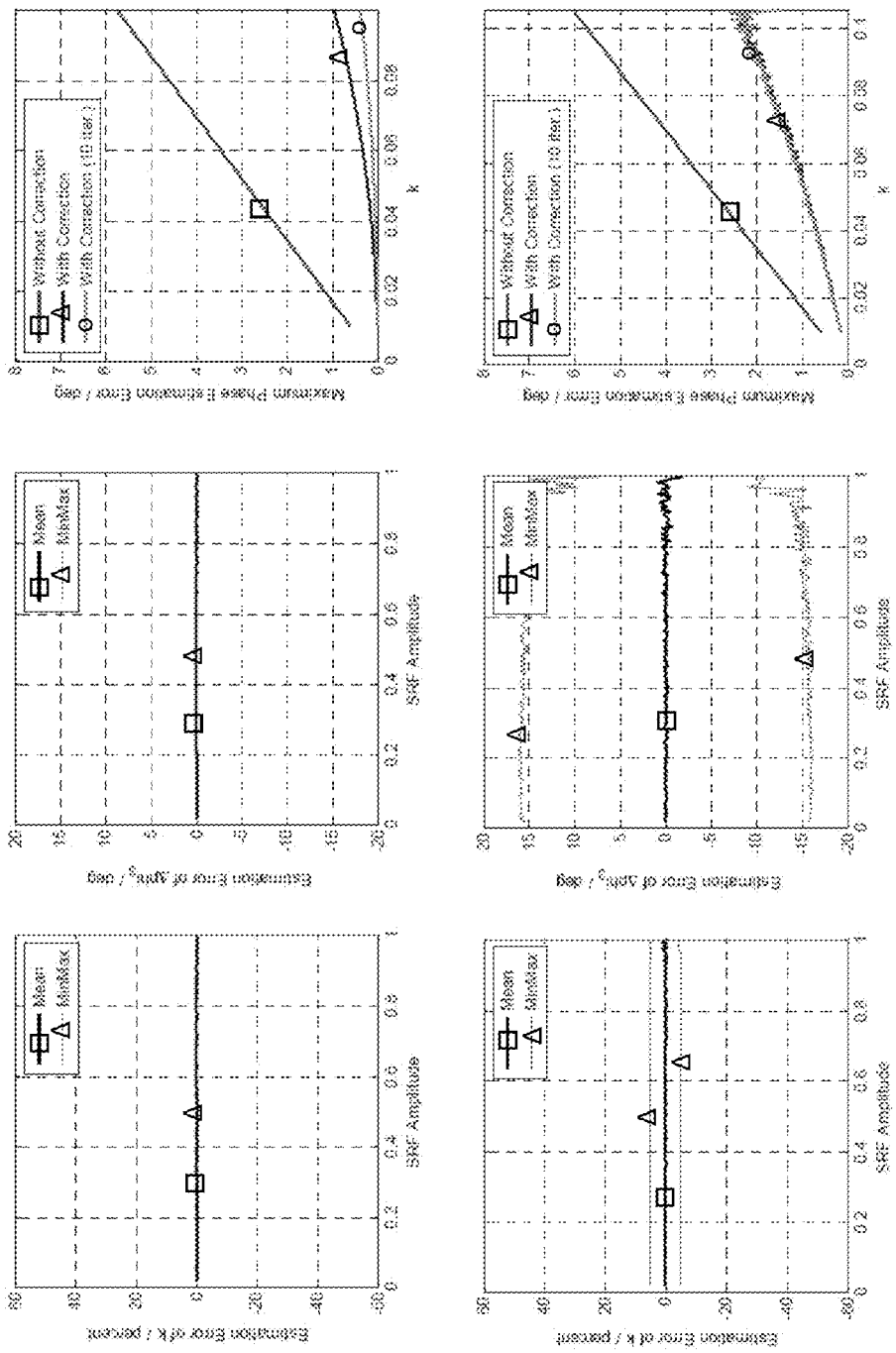
FIGS. 5 and 6 are graphical illustrations showing example results of parametric online calibration and compensation of the wiggling error, according to various implementations.
Figure 6:
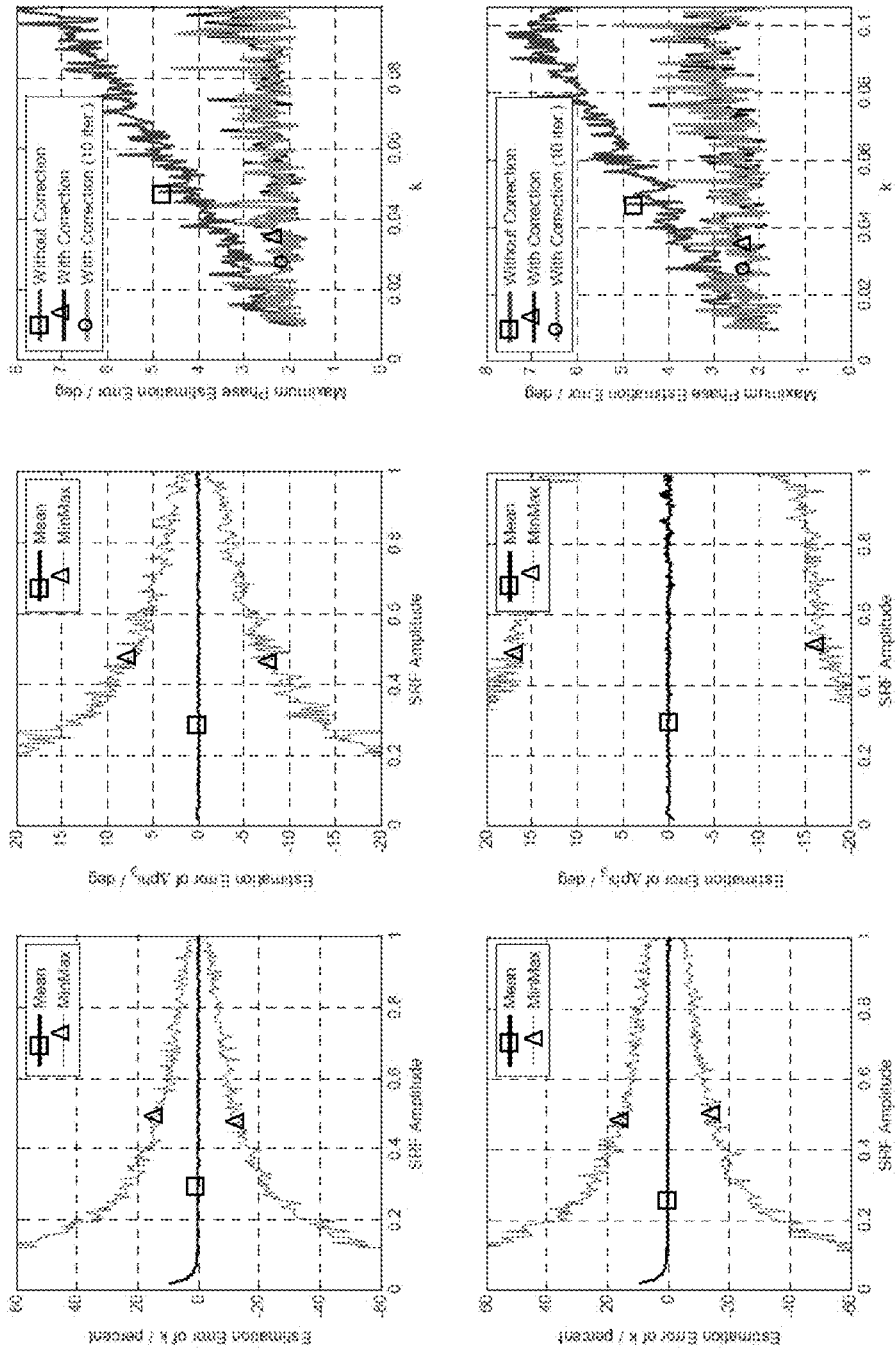

FIGS. 5 and 6 are graphical illustrations showing example results of parametric online calibration and compensation of wiggling error, according to various implementations. The graphical illustrations are the result of various simulations, as described below. Simulation was performed with the following conditions:

Frame 1: $z_1 = f(\varphi_d, A_1, k, \Delta\varphi_3)$      Calibration Frame 1

Frame 2: $z_2 = f(\varphi_d, A_1, k, \Delta\varphi_3)$      Calibration Frame 2

Frame 3: $z_3 = f(\varphi_d + \Delta\varphi_d, A_1 + \Delta A_1(\Delta\varphi_d), k + \Delta k, \Delta\varphi_3 + \theta)$      Test Frame Notes:

The simulation was randomized with respect to $\varphi_d$, $A_1$, k, $\Delta\varphi_3$, $\Delta\varphi_d$, $\Delta k$, $\theta$ within plausible ranges One million trials were performed The terms $\Delta k$ and $\theta$ account for inconsistencies of the wiggling error over frames.

$\Delta A_1$ is the expected amplitude change due to $\Delta\varphi_d$

Additional noise terms were added to z in order to approximate real-world environments.

The following scenarios were simulated:

FIG. 5, upper graph set: Noise-free, Wiggling Error consistent ($\Delta k=0, \theta=0$) [proof of concept]

FIG. 5, lower graph set: Noise-free, Wiggling Error inconsistent (parameter variation of 10%)

FIG. 6, upper graph set: SNR=66 dB (11 Bit Accuracy, i.e., 13 Bit ADC+2 Bit Noise), Wiggling Error consistent ($\Delta k=0$, $\theta=0$)

FIG. 6, lower graph set: SNR=66 dB (11 Bit Accuracy, i.e., 13 Bit ADC+2 Bit Noise), Wiggling Error inconsistent (parameter variation of 10%) [worst-case scenario]

As shown in FIGS. 5 and 6, in all four outlined scenarios, the presented algorithms perform well to compensate for the wiggling error. Note that in the scenarios illustrated in FIG. 6, an additional performance increase based on averaging/pixel clustering etc. can be achieved (e.g., by combining the information from multiple image frames and/or from multiple pixels 302).

Representative Process

Figure 7:
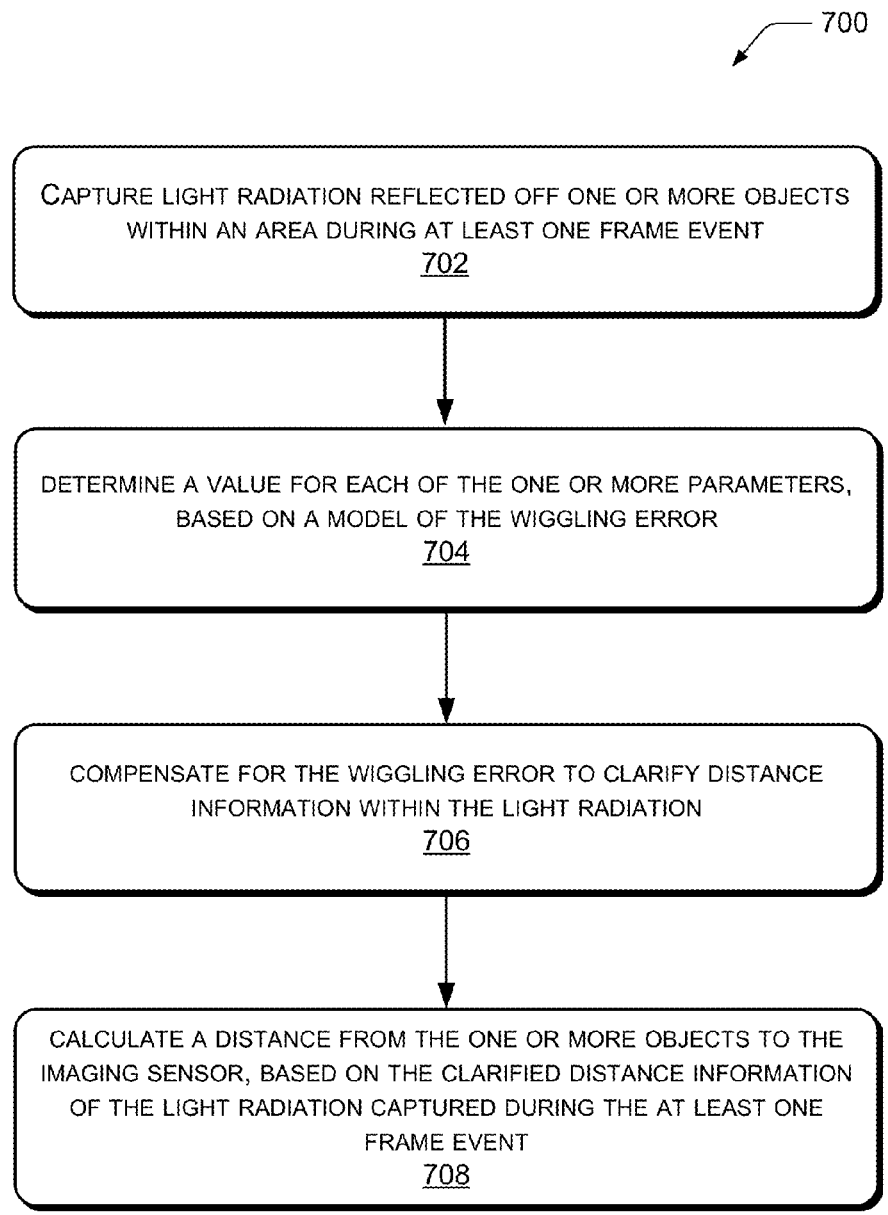
FIG. 7 is a flow diagram illustrating an example process of parametric online calibration and compensation of the wiggling error by an imaging system, according to an implementation.

FIG. 7 illustrates a representative process 700 for adaptively calibrating and compensating for wiggling error at an imaging system (such as imaging system 102) and thus determining correct distance measurements of objects (such as objects 106, for example) from the imaging system. The process 700 describes adaptively compensating for the wiggling error using a parametric model. The process 700 is described with reference to FIGS. 1-6.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable materials, or combinations thereof, without departing from the scope of the subject matter described herein.

In one example, light radiation may be emitted by an emitter (such as illumination module 202, or the like) comprising an LED or laser emitter, for example. In some implementations, the light radiation may be modulated light. For example, the light may be modulated using a modulation component (such as modulation component 204) and may be modulated in correlation to the modulation of one or more photosensitive pixels (such as pixels 302, for example) of the imaging device.

At block 702, the process includes capturing light radiation reflected off one or more objects (such as object 106, for example) within an area (such as area 108, for example) during at least one frame event (i.e., an image capture at a point in time), with an imaging sensor (such as sensor module 206 and/or pixel 302, for example). The imaging sensor may be comprised of one or more photosensitive pixels (such as pixels 302), for example. The light reflection may be received by the imaging sensor via optics, a receiver, an antenna, or the like, for instance.

In an implementation, data output for further processing may comprise of a set of numeric values for each frame event, referring to multiple equidistant samples of a signal based on a waveform of the captured light (i.e., samples of the previously defined sensor-response function (SRF)).

In an implementation, the process includes sampling the SRF during two or more frame events, where in one frame, the sampling locations of one set of the multiple equidistant samples may have a certain offset from the sampling locations of another set of the multiple equidistant samples, captured in another frame. In a further example, the sampling locations of the other multiple equidistant sampling points are shifted half the sampling distance from the sampling locations of the first multiple equidistant sampling points. In yet another example, the process includes alternately sampling the SRF at the sampling locations of the first multiple equidistant sampling points and at the sampling locations of the other multiple equidistant sampling points with each successive frame event.

At block 704, the process includes optionally determining a value for each of the one or more parameters of a model of the wiggling error. In an implementation, one of the one or more parameters comprises a phase offset between the third harmonic and the fundamental waveform of the captured light radiation and another of the one or more parameters comprises a factor representing a ratio of an amplitude of the third harmonic to an amplitude of the fundamental wave.

In an implementation, the process includes estimating a value for each of the one or more parameters by combining data from two or more successive frame events. In another implementation, the process includes combining data from the two or more successive image frames, where respective sampling locations of the two or more sets of equidistant sampling points are offset from each other. In a further implementation, the process includes estimating the value for each of the one or more parameters by combining data from two or more pixels of the imaging system.

At block 706, the process includes compensating for the wiggling error to clarify distance information within the light radiation. In an implementation, the process includes compensating for the wiggling error of light radiation captured during a single frame event, once a value for each of the one or more parameters is determined. In various implementations, the process includes compensating for the wiggling error during runtime of the imaging system.

At block 708, the process includes calculating a distance from the one or more objects to the imaging sensor, based on the clarified distance information of the light radiation captured during the at least one frame event. For example, in an implementation, the process includes calculating a distance from the one or more objects to each pixel of the imaging sensor.

In an implementation, the process further includes time-of-flight techniques such as measuring a time from emitting the light radiation to receiving the reflection of the light radiation and calculating a distance of an object based on the measured time. In various implementations, the process includes outputting image or gesture information to a computing device for input control, or the like. Additionally, the process may include outputting imaging information, such as a distance, a three-dimensional image of the detected object, tracking coordinates of the object, and so forth, to a display device, to another system arranged to process the information, or the like.

In alternate implementations, other techniques may be included in the process in various combinations, and remain within the scope of the disclosure.

Conclusion

Although the implementations of the disclosure have been described in language specific to structural features and/or methodological acts, it is to be understood that the implementations are not necessarily limited to the specific features or acts described. Rather, the specific features and acts are disclosed as representative forms of implementing example devices and techniques.

What is claimed is:

1. An apparatus, comprising:
    an imaging sensor arranged to capture light radiation reflected off one or more objects in an area during one or more frame events; and
    a processing component arranged to calculate a distance from the one or more objects to the imaging sensor, based on determining a value for each of one or more parameters of a model of a wiggling error of the light radiation captured during the one or more frame events, and compensating for the wiggling error,
    wherein the one or more parameters of the model of the wiggling error comprises at least one of a phase offset between a higher-order harmonic and a fundamental wave of the captured light radiation, or a factor representing a ratio of an amplitude of the higher-order harmonic to an amplitude of the fundamental wave.

2. The apparatus of claim 1, wherein the processing component is arranged to generate the model of the wiggling error based on phasors in a complex plane.

3. The apparatus of claim 1, wherein the processing component is arranged to estimate the value for each of the one or more parameters based on the fundamental wave of the captured light radiation and the higher-order harmonic.

4. The apparatus of claim 3, wherein the processing component is arranged to estimate the phase offset between the higher-order harmonic and the fundamental wave of the captured light radiation and the factor representing the ratio of the amplitude of the higher-order harmonic to the amplitude of the fundamental wave.

5. The apparatus of claim 1, wherein the processing component is arranged to adaptively compensate for the wiggling error of the light radiation captured during a single frame event or during multiple frame events, including dynamically determining updated values for each of the one or more parameters.

6. The apparatus of claim 1, wherein the processing component is arranged to sample a signal based on a waveform of the captured light radiation at multiple equidistant sampling points, each sampling point located at a predetermined phase on the waveform.

7. The apparatus of claim 1, wherein the processing component is arranged to sample a signal based on a waveform of the captured light radiation at first multiple equidistant sampling points, and with successive frame events, to sample the signal based on the waveform of the captured light radiation at other multiple equidistant sampling points, shifted by a predetermined angular offset from the first multiple equidistant sampling points.

8. The apparatus of claim 1, wherein the imaging sensor is comprised of multiple pixel devices, and wherein the processing component is arranged to calculate a distance from the one or more objects to each pixel device of the imaging sensor based on estimating the value for each of the one or more parameters by combining information from light radiation captured by two or more pixels of the imaging sensor.

9. The apparatus of claim 1, wherein the imaging sensor is arranged to capture a three-dimensional image of the area using time-of-flight principles during one or more frame events, and to compensate for the wiggling error of the captured light radiation during runtime.

10. A system, comprising:
    an illumination module arranged to emit light radiation to illuminate an area;
    a sensor module comprising a plurality of pixels arranged to capture light radiation reflected off one or more objects in the area during one or more frame events; and
    a control module arranged to determine a value for each of one or more parameters of a model of a wiggling error of the light radiation captured during the one or more frame events, to compensate for the wiggling error during runtime, and to calculate a distance from the one or more objects to individual pixels of the plurality of pixels, based on the light radiation captured by the individual pixels and compensated for the wiggling error,
    wherein the one or more parameters of the model of the wiggling error comprises at least one of a phase offset between a higher-order harmonic and a fundamental wave of the captured light radiation, or a factor representing a ratio of an amplitude of the higher-order harmonic to an amplitude of the fundamental wave.

11. The system of claim 10, the control module further arranged to dynamically estimate and/or update a value for each of the one or more parameters of the model as characteristics of the wiggling error vary over time, over a single pixel of the plurality of pixels, or over the area as a scene of the area varies.

12. The system of claim 10, the control module further arranged to compensate for the wiggling error and to calculate the distance from the one or more objects to individual pixels based on using one acquired frame event, independent from previous frames and without interdependency between frame events.

13. The system of claim 10, wherein an output of an individual pixel of the plurality of pixels includes the fundamental wave having higher frequency components superimposed thereon, the control module further arranged to adaptively compensate for the higher frequency components and to clarify distance information captured by the sensor module.

14. A method, comprising:
    capturing light radiation reflected off one or more objects within an area during at least one frame event, with an imaging sensor;
    determining a value for one or more parameters, based on a model of a wiggling error of the light radiation captured off the one or more objects within the area during the at least one frame event;
    compensating for the wiggling error to clarify distance information within the light radiation; and
    calculating a distance from the one or more objects to the imaging sensor, based on the clarified distance information of the light radiation captured during the at least one frame event,
    wherein the one or more parameters of the model of the wiggling error comprises at least one of a phase offset between a higher-order harmonic and a fundamental wave of the captured light radiation, or a factor representing a ratio of an amplitude of the higher-order harmonic to an amplitude of the fundamental wave.

15. The method of claim 14, further comprising modelling the wiggling error using phasors in a complex plane having reference to the fundamental wave of the captured light radiation and the higher-order harmonic.

16. The method of claim 14, wherein one of the one or more parameters comprises the phase offset between the higher-order harmonic and the fundamental wave of the captured light radiation and another of the one or more parameters comprises the factor representing the ratio of the amplitude of the higher-order harmonic to the amplitude of the fundamental wave.

17. The method of claim 14, further comprising generating data comprising a set of numeric values for each frame event, the set of numeric values representing multiple equidistant samples of a signal based on a waveform of the captured light radiation.

18. The method of claim 17, further comprising sampling the signal during two or more frame events, wherein sampling locations of a first set of the multiple equidistant samples captured during a first frame event have an offset from sampling locations of another set of the multiple equidistant samples captured during another frame event.

19. The method of claim 18, wherein the sampling locations of the other set of the multiple equidistant samples are shifted half of a sampling distance from the sampling locations of the first set of the multiple equidistant samples.

20. The method of claim 18, further comprising alternately sampling the signal at the sampling locations of the first set of the multiple equidistant samples and at the sampling locations of the other set of the multiple equidistant samples with each successive frame event.

21. The method of claim 14, further comprising combining data from two or more successive frame events, wherein respective sampling locations of two or more sets of equidistant samples captured during the two or more successive frame events are offset from each other.

22. The method of claim 14, further comprising estimating a value for each of the one or more parameters by combining data from two or more successive frame events.

23. The method of claim 14, further comprising estimating the value for each of the one or more parameters by combining data from two or more pixels of the imaging sensor.

24. The method of claim 14, further comprising compensating for the wiggling error once a value for each of the one or more parameters is determined.

25. The method of claim 14, further comprising compensating for the wiggling error during runtime of the imaging sensor.

26. A three-dimensional imaging device, comprising:
an imaging sensor arranged to capture a three-dimensional image of an area based on time-of-flight principles, the imaging sensor comprising a plurality of pixels arranged to capture light radiation reflected off one or more objects in the area during one or more frame events, the light radiation comprising distance information and higher-order harmonics which result in a wiggling error upon distance estimation; and
a processing component arranged to calculate a distance from the one or more objects to individual pixels of the imaging sensor, based on clarifying the distance information of the light radiation captured during the one or more frame events, the processing component arranged to estimate a value for each of two parameters of a phasor-based model of the wiggling error and to compensate for the wiggling error during runtime, a first of the two parameters comprising a phase offset between a higher-order harmonic and a fundamental wave of the captured light radiation, and a second of the two parameters comprising a factor representing a ratio of an amplitude of the higher-order harmonic to an amplitude of the fundamental wave.

* * * * *